(12) United States Patent
Nagai

(10) Patent No.: US 6,267,042 B1
(45) Date of Patent: Jul. 31, 2001

(54) POSITION DETECTOR FOR FLUID CYLINDER

(75) Inventor: Katsumi Nagai, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/366,918

(22) Filed: Aug. 4, 1999

(30) Foreign Application Priority Data

Aug. 7, 1998 (JP) ................................... 10-224946
Aug. 27, 1998 (JP) ................................... 10-241707

(51) Int. Cl.⁷ .................................................. F01B 25/26
(52) U.S. Cl. ........................ 92/5 R; 367/97; 414/273
(58) Field of Search ........................... 91/1, 361; 92/5 R; 367/97; 414/273, 631

(56) References Cited

U.S. PATENT DOCUMENTS

| 4,543,649 | * | 9/1985 | Head et al. | 367/96 |
| 4,634,332 | * | 1/1987 | Kamide et al. | 414/273 |
| 4,936,143 | * | 6/1990 | Schutten et al. | 92/5 R |
| 5,124,954 | * | 6/1992 | Hordijk | 367/99 |
| 5,977,778 | * | 11/1999 | Chan et al. | 92/5 R |
| 6,119,579 | * | 9/2000 | Pawelski | 92/5 R |

FOREIGN PATENT DOCUMENTS 1525720  9/1978  (GB) .
59-4599  1/1984  (JP) .
6-24699  2/1994  (JP) .

* cited by examiner

Primary Examiner—Edward K. Look
Assistant Examiner—Michael Leslie
(74) Attorney, Agent, or Firm—Morgan & Finnegan, LLP (57) ABSTRACT

A position detector includes a fluid cylinder having a piston. An ultrasonic transceiver is provided at one end of the piston outside of the moving range of the piston. In response to electrical signals, the ultrasonic transceiver transmits ultrasonic waves to a reflection surface of the piston. The transceiver receives the ultrasonic waves reflected by the piston and then generates electrical signals representing the reflected waves. A sensor detects that the piston is at a predetermined position, at which the distance to the transceiver is known. A CPU supplies electrical signals to the ultrasonic transceiver to produce ultrasonic waves and receives electrical signals representing the reflected waves from the ultrasonic transceiver. The CPU then computes a piston position value, which is a function of the travel time from when an ultrasonic wave is transmitted to when the reflected wave is received and the speed of the waves. The CPU determines the speed of the waves when the piston is detected to be at the reference position. The CPU then computes the current position of the piston based on the speed of the waves and on a current reading of the travel time.

29 Claims, 8 Drawing Sheets

POSITION DETECTOR FOR FLUID CYLINDER

BACKGROUND OF THE INVENTION

The present invention relates to a position detector for a movable body. More particularly, the present invention pertains to a device for detecting the position of a piston in a fluid cylinder used in industrial vehicles.

A typical forklift has a fork for lifting and lowering a cargo. Some forklifts are equipped with an automatic controller for lowering or lifting the fork to a predetermined position. The automatic controller requires a fork height sensor to continuously detect the height of the fork.

Reel-type fork height sensors are known in the art. A reel type sensor includes a wire, a reel for winding the wire and a rotation sensor such as a potentiometer. One end of the wire is connected to an inner mast. The rotation sensor detects rotation of the reel. The height of the fork is detected based on the rotational position of the reel.

However, the wire is exposed. Therefore, when the forklift is operated, the wire can be damaged by contact with foreign objects, which may cut the wire or damage the potentiometer. The reliability of the sensor is thus low.

To solve the above problem, fork height detectors using an ultrasonic sensor have been introduced. This fork height detector includes a lift cylinder for lifting and lowering a fork and an ultrasonic sensor located in the lift cylinder. The ultrasonic sensor detects the location of a piston in the lift cylinder. The height of the fork is based on the detected position of the piston. Specifically, the lift cylinder includes a cylindrical housing, a piston accommodated in the housing and an ultrasonic element. The ultrasonic element is located at the bottom of the cylindrical housing. The ultrasonic element produces ultrasonic waves to the end surface of the piston and receives the reflected ultrasonic waves. The distance between the element and the piston, or the position of the piston, is calculated based on the traveling time of ultrasonic waves, or the time from when ultrasonic waves are output to when reflected waves are received. The height of the fork is calculated based on the detected piston position. Unlike reel type sensors, the functional part of the ultrasonic height detector is not exposed. Therefore, the height detector is less vulnerable to damage, which improves reliability.

Figure 6:
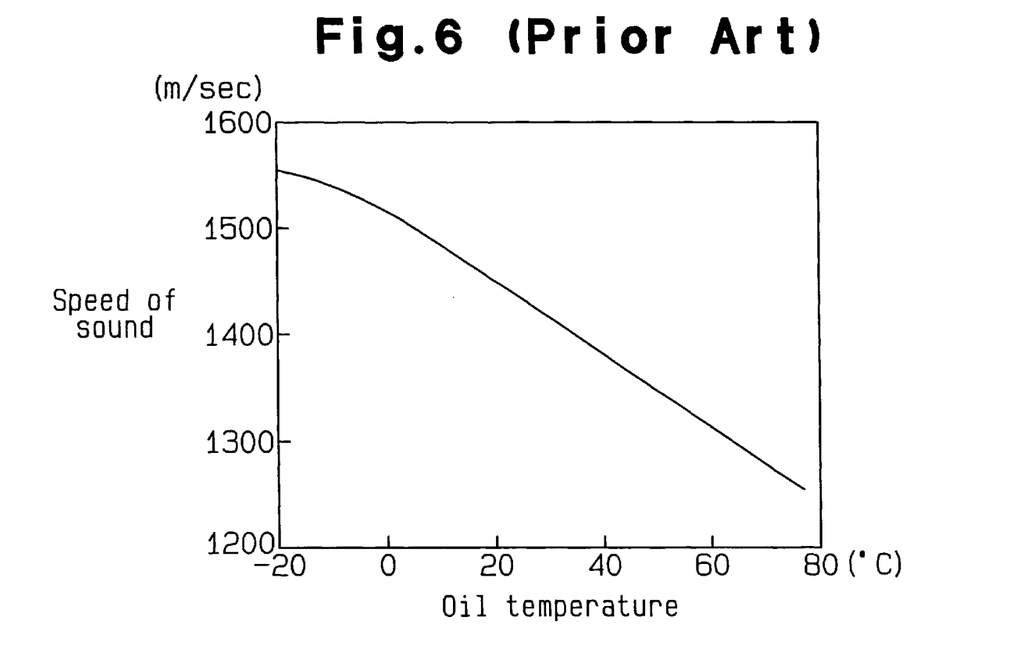
FIG. 6 is a graph showing the relationship between the temperature of hydraulic oil and the speed of sound in the oil.
Figure 7:
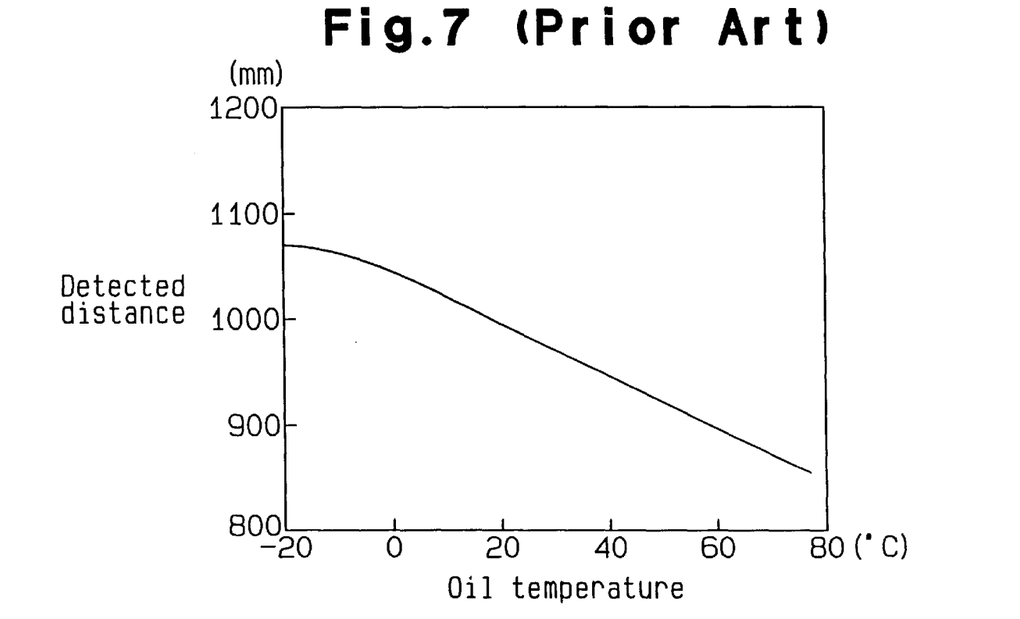
FIG. 7 is a graph showing the relationship between the temperature of hydraulic oil and a detected position of a piston.

However, the detection accuracy of ultrasonic sensors is low. Ultrasonic waves from an ultrasonic element are transmitted through oil in a cylindrical housing, or oil chamber. As shown in FIG. 6, the transmission speed of ultrasonic waves (speed of sound) varies in accordance with the temperature of the oil. As a result, when the piston stays at a certain position, the position detected by the ultrasonic sensor changes in accordance with temperature of the oil as shown in FIG. 7. The temperature of the oil in the lift cylinder is greatly varied by the ambient temperature and the duration of forklift operation. The temperature changes of the oil lower the detection accuracy of the fork height detector.

Therefore, the detected position of the piston includes an error due to the temperature of the oil, which prevents the accurate position of the fork from being detected. Further, the low accuracy of the height detection lowers the accuracy of the fork control.

In order to produce ultrasonic waves from the ultrasonic element, an oscillation signal is sent to an ultrasonic oscillator in the ultrasonic sensor. Once oscillated, the ultrasonic element does not stop oscillating immediately after the oscillation signal is stopped. While being dampened, the ultrasonic oscillation continues for a certain time. This called reverberation.

Figure 11:
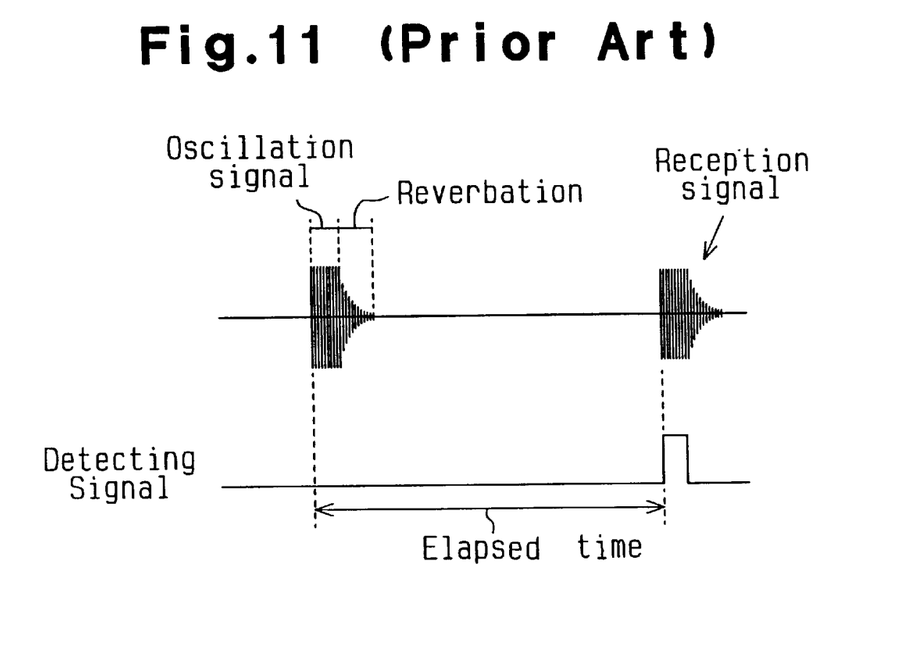
FIG. 11 is a graph showing voltage signals generated in an ultrasonic transmit-receive element.

As shown in FIG. 11, reverberation remaining in the ultrasonic element generates a voltage signal. Therefore, if the reflection of an ultrasonic wave produced by the ultrasonic oscillator is received by the ultrasonic element while there is reverberation, the reflected wave is mixed with the reverberation. That is, the reflected wave and the reverberation are not distinguished. This lowers the reliability of the detection value. Using a fork height sensor having such an ultrasonic element causes a problem. When the fork is at the lowest position, the piston of the lift cylinder is extremely close to the ultrasonic element. At this time, an ultrasonic wave reflected by the piston can interfere with a subsequent ultrasonic wave produced by the ultrasonic element, which prevents the position of the piston, or the height of the fork, from being accurately detected.

SUMMARY OF THE INVENTION

Accordingly, it is an objective of the present invention to provide a position detector for continuously detecting the position of a movable body with accuracy.

To achieve the foregoing and other objections and in accordance with the purpose of the present invention, a position detector for a piston in a fluid cylinder is provided. The piston is axially moved within a predetermined range by fluid and the fluid pressure. The position detector includes an ultrasonic transceiver provided in the cylinder, a reference position detector and a computer. The transceiver is located near one end of the cylinder and outside of the moving range of the piston. The transceiver transmits an ultrasonic wave to a reflection surface of the piston through a fluid in response to an electrical signal. The transceiver receives the ultrasonic wave reflected by the piston and generates an electrical signal, which corresponds to the reflected wave. The reference position detector detects that the piston is at a predetermined reference position. The computer supplies an electrical transmit signal to the transceiver, which causes the transceiver to transmit an ultrasonic signal. The computer also receives an electrical reception signal from the transceiver. The computer computes a time value representing the time from when an ultrasonic wave is transmitted to when the reflected wave is received. The computer computes a speed indication value that indicates the speed of the ultrasonic signal when the piston is at the reference position. Further, the computer computes the current position of the piston based on the speed indication value and on a current reading of the time value.

The present invention may be embodied in a fluid cylinder having a piston. The piston is axially moved within a predetermined range by fluid pressure. The cylinder includes an ultrasonic transceiver in the cylinder and a reference position detector. The transceiver is located near one end of the cylinder and outside of the moving range of the piston. The transceiver transmits an ultrasonic wave to a reflection surface of the piston through a fluid in response to an electrical signal. The transceiver receives the ultrasonic wave reflected by the piston and generates an electrical signal, which corresponds to the reflected wave. The reference position detector detects that the piston is at a predetermined reference position.

The present invention may be embodied in an industrial vehicle including an implement, a mast, a position detector. The mast moves the implement. The position detector detects the position of the mast. The position detector includes a computer, which detects the position of the implement.

The present invention may be embodied in a fluid cylinder having a piston. The cylinder includes a transmitting element and a receiving element. The transmitting element is located in the fluid cylinder to transmit ultrasonic waves to a reflection surface of the piston. The receiving element is located in the fluid cylinder and is separated from the transmitting element. The receiving element receives the ultrasonic waves reflected by the piston.

The present invention may be embodied in a position detector for a piston in a fluid cylinder. The position detector includes a transmitting element, a receiving element and a computer. The transmitting element is provided in the cylinder and is located outside of the moving range of the piston. The transmitting element transmits an ultrasonic wave to a reflection surface of the piston through a fluid in response to an electrical signal. The receiving element is located in the fluid cylinder and is located outside of the moving range of the piston. The receiving element is separated from the transmitting element. The receiving element receives the ultrasonic waves reflected by the piston and generates an electrical signal, which corresponds to the reflected wave. The computer supplies an electrical signal to the transmitting element to cause the transmitting element to transmit an ultrasonic wave. The computer receives the electrical signal corresponding to the reflected ultrasonic wave from the receiving element. The computer computes a distance detection value, which is a function of the travel time from when an ultrasonic wave is transmitted to when the reflected wave is received.

The present invention may be embodied in an industrial vehicle having an implement, a mast for moving the implement, a position detector for detecting the position of the mast and a fluid cylinder for moving the mast. The cylinder includes a piston.

Further, the present invention may be embodied a method for detecting the position of a piston in a fluid cylinder. The method includes: periodically transmitting an ultrasonic signal from a fixed position to the piston through the fluid, receiving the reflected ultrasonic signal, measuring time from when the ultrasonic signal is transmitted to when the reflected ultrasonic signal is received, judging that the piston is at a reference position, wherein the reference position is at a predetermined distance from the fixed position, computing a speed indication value that indicates the speed of the ultrasonic signal based on the measured time and the reference position when the piston is at the reference position, and computing the current position of the piston based on the speed indication value and a current reading of the measured time.

The present invention may be embodied in another method for detecting the position of a piston in a fluid cylinder. The method includes: periodically transmitting an ultrasonic signal from a first location to the piston through the fluid, receiving the reflected ultrasonic signal at a second location, wherein the first location is spaced from the second location, measuring time from when the ultrasonic signal is transmitted to when the reflected ultrasonic signal is received, and computing the current position of the piston based on the measured time.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A height detector for a forklift according to a first embodiment of the present invention will now be described with reference to FIGS. 1 to 3.

Figure 3:
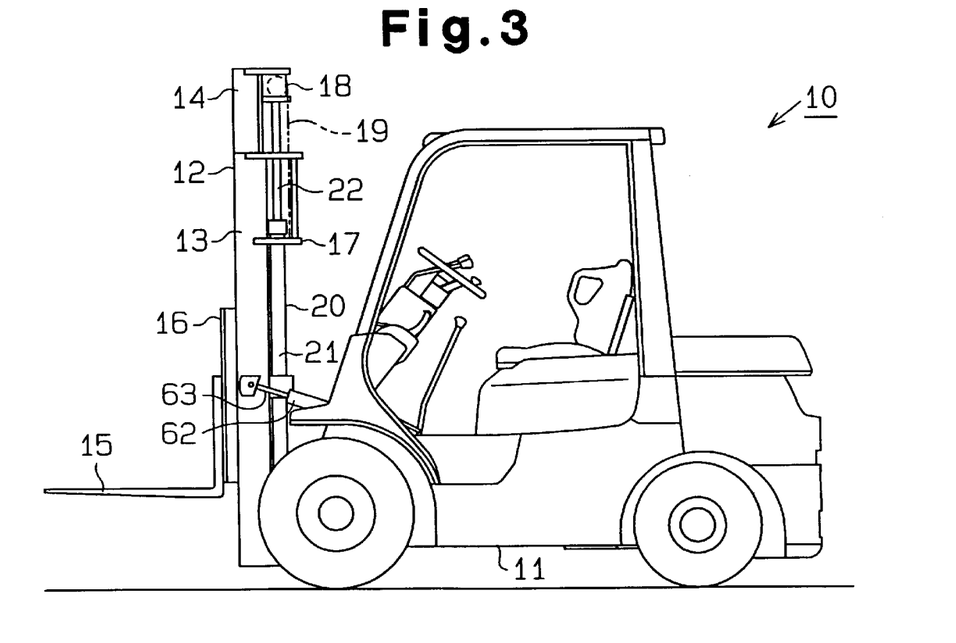
FIG. 3 a side view illustrating a forklift equipped with the height detector of FIG. 1.

As shown in FIG. 3, an industrial vehicle, or forklift 10, includes a mast assembly 12, which is arranged on the front of a body frame 11. The mast assembly 12 includes a pair of outer masts 13 and a pair of inner masts 14. The inner masts 14 are arranged inside of the outer masts 13 and are lifted and lowered relative to the outer masts 13. A lift bracket 16 is arranged inside the inner masts 14. A loading attachment, or fork 15, is supported by the lift bracket 16. The lift bracket 16 is suspended by a chain 19 and is lifted and lowered relative to the inner masts 14. The chain 19 is engaged with a sprocket 18 located at the upper end of one of the inner masts 14. The other end of the chain 19 is connected to a crossbeam 17, which combines the outer masts 13. A pair of tilt cylinders are coupled to the body frame 11 to incline the outer masts 13. Each tilt cylinder 62 includes a rod 63, the distal end of which is coupled to the corresponding outer mast 13.

A pair of fluid cylinders, or hydraulic lift cylinders 20, are located behind the mast assembly 12. Each lift cylinder 20 includes a cylinder body 21 fixed to the corresponding outer mast 13 and a piston rod 22. The upper end of each piston rod 22 is coupled to the corresponding inner mast 14.

Figure 1:
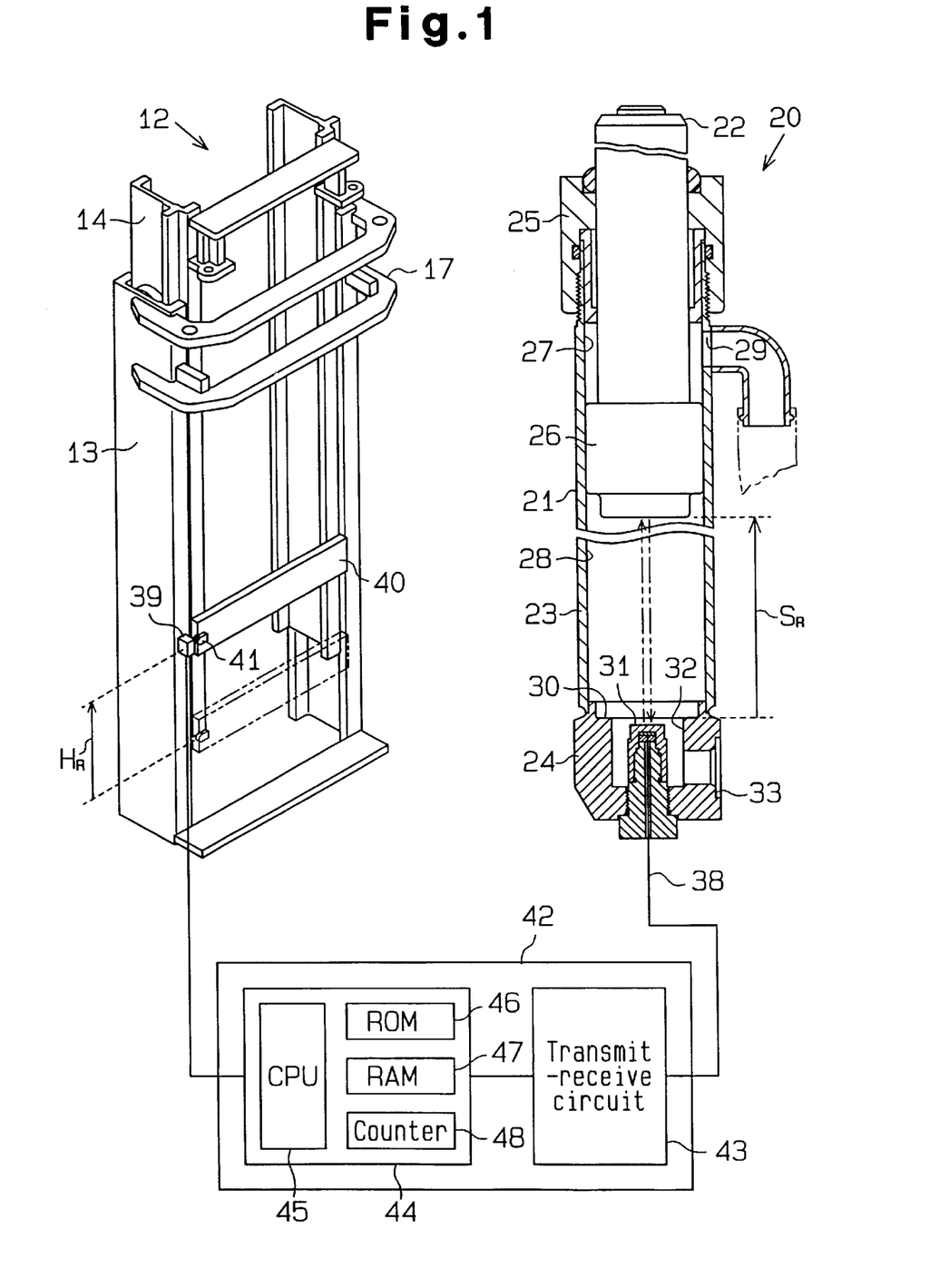
FIG. 1 is a diagrammatic view showing a height detector according to a first embodiment of the present invention.

As shown in FIG. 1, a cylinder body 21 of each lift cylinder 20 includes a cylindrical housing 23, a bottom block 24 and a rod cover 25. A piston 26 is housed in the housing 23 and is coupled to the lower end of the piston rod 22.

An air chamber 27 is defined in the cylinder body 21 above the piston 26. An oil chamber 28 is defined below the piston 26. The air chamber 27 is connected to an air outlet 29.

A stopper step 30 is formed in the top of the bottom block 24. The stopper step 30 limits the downward movement of the piston 26 by contacting the bottom surface of the piston 26. A sensor chamber 32 is defined below the stopper step 30 to accommodate an ultrasonic transceiver 31. A port 33 is formed in the sidewall of the chamber 32. Oil is supplied to and drained from the oil chamber 28 through the port 33. The port 33 is connected to a control valve (not shown) through a flow regulator valve (not shown). The control valve is located in the body frame 11 and is controlled by a lift lever.

A limit switch 39 is attached to the back of the left outer mast 13. The inner masts 14 are connected by a tie beam 40. A dog 41 for activating the limit switch 39 is attached to the back of the tie beam 40. The limit switch 39 and the dog 41 detect that the fork 15 is at a reference position $H_R$.

The height of the fork 15 ranges from zero to Hmax. When the fork 15 is at the reference position $H_R$, the limit switch 39 is activated by the dog 41.

The position of the piston 26 corresponds to the height of the fork 15. The piston 26 moves in a range from zero to Smax. A reference position $S_R$ of the piston 26 corresponds to the reference position $H_R$ of the fork 15. The reference position $S_R$ of the piston 26 may correspond to any height of the fork 15 that is equal to or greater than zero and smaller than the middle height (Hmax/2). For example, the position $S_R$ of the piston 26 may correspond to a fork height of zero.

Figure 2:
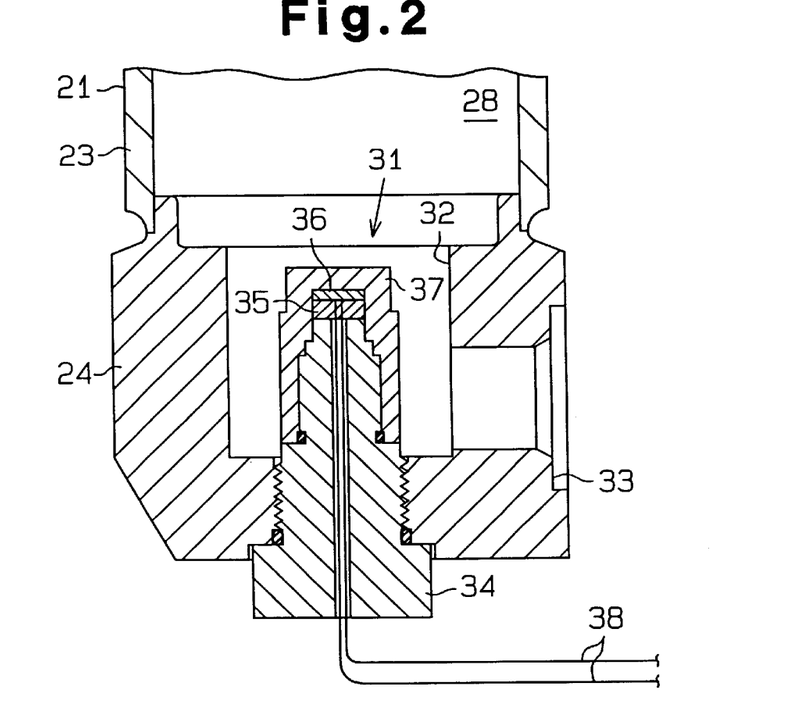
FIG. 2 is an enlarged partial cross-sectional view illustrating the lift cylinder of FIG. 1.

As shown in FIG. 2, the ultrasonic transceiver 31 includes a case 34, an acoustical material 35, an ultrasonic element 36 and a cap 37. The case 34 is threaded to the bottom of the bottom block 24. The acoustical material 35 is fixed to the upper end of the case 34. The ultrasonic element 36 is secured to the top of the acoustical material 35. A pair of signal wires 38 are connected to the ultrasonic element 36 and extend from the bottom of the case 34. The cap 37 covers the ultrasonic element 36 and the acoustical material 35.

The ultrasonic element 36 includes a transmit-receive surface facing the bottom of the piston 26 to produce and receive ultrasonic waves and includes. When receiving high frequency signal having a predetermined frequency through the wires 38, the ultrasonic element 36 oscillates to produce ultrasonic waves from the transmit-receive surface to the bottom of the piston 26. The ultrasonic element 36 then receives ultrasonic waves reflected by the bottom of the piston 26 through the transmit-receive surface and outputs a signal in accordance with the amplitude of the reflected waves through the wires 38.

Referring back to FIG. 1, the wires 38 of the ultrasonic transceiver 31 are connected to a control unit 42 in the body frame 11 shown in FIG. 3. The control unit 42 includes a transmit-receive circuit 43 and a microcomputer 44. The wires 38 are connected to the transmit-receive circuit 43. The transmit-receive circuit 43 is connected to the microcomputer 44. The limit switch 39 is also connected to the microcomputer 44.

The transmit-receive circuit 43 has a conventional circuit construction and includes a transmitter circuit and a receiver circuit (both not shown). The transmitter circuit includes an oscillating circuit and a driver circuit, and the receiver circuit includes an amplifier, a band-pass circuit, a detector and a comparator. The microcomputer 44 commands the transmit-receive circuit 43 to oscillate the ultrasonic element 36 at certain timing for certain duration. When receiving a signal having an amplitude greater than a predetermined level from the ultrasonic element, the transmit-receive circuit 43 outputs a detection pulse signal to the microcomputer 44.

The microcomputer 44 includes a central processing unit (CPU) 45, a read-only memory (ROM) 46, a random-access memory (RAM) 47 and a counter 48. The ROM 46 stores programs executed by the CPU 45 and data representing the reference position $S_R$.

The CPU 45 controls the transmit-receive circuit 43 thereby causing the ultrasonic transceiver 31 to produce ultrasonic waves of certain duration at a certain timing. The periods between the productions of ultrasonic waves are set longer than the traveling time of an ultrasonic wave from the ultrasonic transceiver 31 back to the transceiver 31 when the piston 26 is at the position Smax. At every period, the CPU 45 measures time from the production of an ultrasonic wave to reception of the reflected ultrasonic wave by the counter 48. The CPU 45 sets the measured time as an elapsed time tx, which corresponds to the current position of the piston 26. The CPU 45 measures and renews the elapsed time tx for each production of ultrasonic waves.

When receiving a detection signal from the limit switch 39, the CPU 45 judges that the piston 26 is at the reference position $S_R$. At this time, the CPU 45 stores a reference time tR in the RAM 47. The reference time tR is equal to the current elapsed time tx when the limit switch 39 detects that the piston 26 is in the reference position $S_R$. The CPU 45 calculates the current position Sx of the piston 26 using the current detected elapsed time tx, the stored reference time tP and the reference position $S_R$ in accordance with the following equation (1). The temperature of the oil when the elapsed time tx is detected is substantially the same as the temperature of the oil when the reference time tR is measured.

$$Sx = tx \cdot v \times S_R / (tR \cdot v) = tx \times S_R / tR \quad (1)$$

The value v represents the speed of an ultrasonic wave in the oil. The value v is a function of the temperature of the oil.

Referring to the equation (1), at a certain temperature of the oil, the elapsed time tx when the piston 26 is at the reference position $S_R$ is set as the reference time tR. Accordingly, a ratio $S_R/tR$ is a correction factor, by which the elapsed time tx is multiplied. The correction factor is the speed v of an ultrasonic wave at the current oil temperature. Thus, the correction factor $S_R/tR$ is sometimes referred to herein as a speed indication value. Therefore, using the correction factor $S_R/tR$, the position Sx of the piston 26, which is measured from the reference position $S_R$, is calculated. In other words, the position Sx of the piston 26 is accurately corrected to account for the temperature of the oil.

The value tx·v is a distance detection value and the value tR·v is a distance detection value when the reference position $S_R$ is detected. The value $S_R/(tR \cdot v)$ is a ratio of the reference position $S_R$ to the detected distance of the reference position $S_R$.

The CPU 45 renews the reference time tR with a newly detected elapsed time tx every time the CPU 45 receives a detection signal from the limit switch 39, or every time the limit switch detects the reference position $S_R$. The CPU 45 then stores the renewed reference time tR in the RAM 47. In this manner, the CPU 45 renews the correction factor $S_R/tR$ such that the correction factor $S_R/tR$ corresponds to the current temperature of the oil. Accordingly, the position Sx of the piston 26 is accurately detected even if the oil temperature changes.

The CPU 45 calculates the height of the fork 15 using the calculated position Sx of the piston 26 referring to a predetermined formula.

The operation of the height detector will now be described.

Starting the forklift 10 activates the microcomputer 44 in the control unit 42. At this time, the CPU 45 uses an initial value of the reference time tR, for example the time tR when the oil temperature is twenty degrees centigrade. The CPU 45 calculates the piston position Sx based on the continually measured elapsed time tx and the reference time tR using the formula (1).

When an operator manipulates a lift lever (not shown) to switch the control valve thereby supplying oil to or draining oil from the oil chamber 28, the piston 26 is lifted or lowered. The movement of the piston 26 extends or retracts the piston rod 22, which lifts or lowers the fork 15. The height of the fork 15 is changed, accordingly.

In accordance with commands from the CPU 45, the ultrasonic transceiver 31 produces ultrasonic waves. The ultrasonic waves reach the bottom of the piston 26 through oil and are then reflected. Subsequently, the reflected waves are received by the transceiver 31. The time from when an ultrasonic wave is output to when the reflected ultrasonic wave is received depends on the temperature of the oil. When receiving the reflected ultrasonic wave, the ultrasonic transceiver 31 outputs a reception signal to the transmit-receive circuit 43. The transmit-receive circuit 43 then outputs a detection signal to the microcomputer 44. The CPU 45 uses the counter 48 to measure the time from when it commands the transceiver 31 to produce an ultrasonic wave to when the CPU 45 receives a detection signal. The CPU 45 then renews the elapsed time tx with the measured time. The renewed elapsed time tx indicates the current piston position Sx.

When the fork 15 is in the reference position $H_R$, the limit switch 39 sends a detection signal to the microcomputer 44. On receiving the detection signal, the CPU 45 sets the elapsed time tx measured at that time as the reference time tR, which corresponds to the reference position $S_R$ and stores the reference time $t_R$ in the RAM 47. Until next time the reference time tR is renewed, the CPU 45 calculates the position Sx of the piston 26 assuming the temperature of the oil is the same as the temperature when the time tR was measured. When the fork 15 moves, the CPU 45 calculates the piston position Sx using the formula (1) based on the newly measured elapsed time tx, the reference position $S_R$ and the reference time tR. When these calculations are performed, not much time has elapsed since last time the reference time tR was renewed, and the current oil temperature is substantially the same as the oil temperature when the reference time tR was measured. Therefore, the calculated piston position Sx is an accurate value, which accounts for the oil temperature.

As the lift cylinder 20 is reciprocated, the piston 26 repeatedly passes by the limit switch 39, which increases the oil temperature. Every time the piston 26 passes by the reference position $S_R$, the limit switch 39 outputs a detection signal. Every time the CPU 45 receives a new detection signal from the limit switch 39, the CPU 45 renews the reference time tR stored in the RAM 47 with a value according to the current oil temperature. The CPU 45 obtains the piston position Sx using the formula (1) based on the newly measured tx, the reference position $S_R$ and the renewed reference time tR. Therefore, even if the oil temperature changes, the piston position Sx is accurately calculated taking the current oil temperature in to account.

The height detector of FIGS. 1 to 3 has the following advantages.

(1) The reference time tR is renewed every time the fork 15 passes by the reference position $H_R$. That is, the reference time tR constantly reflects the current oil temperature, which eliminates errors of the piston position Sx due to changes of the oil temperature. As a result, the height of the fork 15 is accurately and continuously detected. Accordingly, various controls performed based on the position of the fork 15 will be accurate.

(2) The piston position Sx is detected without measuring the oil temperature. Thus, the lift cylinder 20 does not require a temperature sensor for measuring the oil temperature. Further, a conventional lift cylinder may be used as the lift cylinder 20.

(3) The limit switch 39 is located in a lower range that is below the middle of the moving range of the fork 15. The fork 15 is frequently moved in the lower range. Therefore, the reference time tR is frequently renewed. As a result, the position of the fork 15 is accurately detected.

(4) Since transmission and reception of ultrasonic waves are performed by a single sensor, or the ultrasonic transceiver 31, the transceiver 31 can be accommodated in relatively small diameter lift cylinders. In other words, the position Sx of the piston 26 can be accurately detected in small-diameter lift cylinders.

(5) The reference position $S_R$ is detected by the limit switch 39. Since the limit switch 39 is relatively inexpensive, accurate detection of the fork position is possible without significantly increasing the manufacturing cost.

Figure 4:
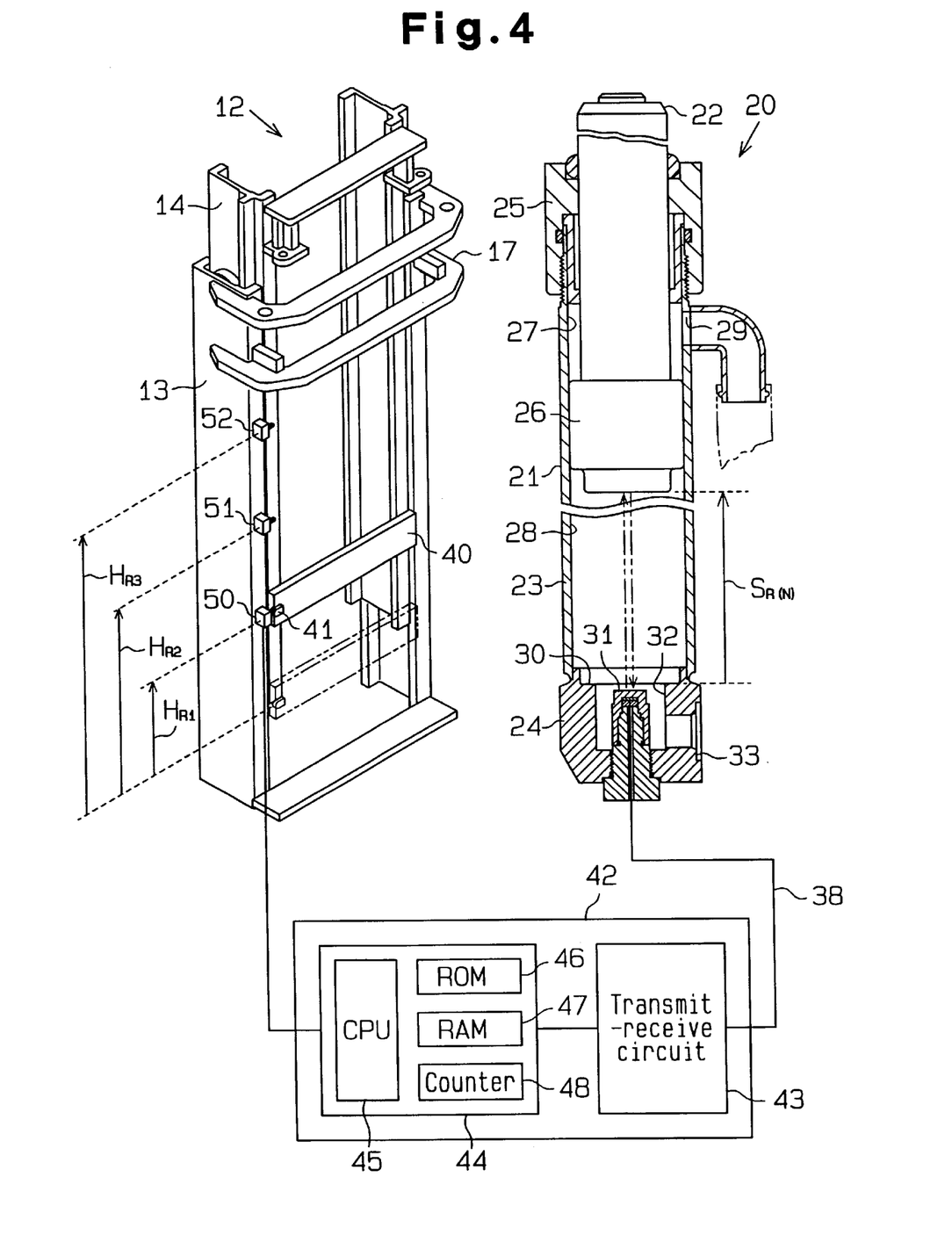
FIG. 4 is a diagrammatic view showing a height detector according to a second embodiment of the present invention.

A second embodiment of the present invention will now be described with reference to FIG. 4. The device of FIG. 4 is different from the device of FIGS. 1 to 3 in that the device of FIG. 4 has multiple limit switches 50, 51 and 52 and that the programs executed by the microcomputers 44 are different from those of the embodiment of FIGS. 1 to 3. Like or the same reference numerals are given to those components that are like or the same as the corresponding components of FIGS. 1–3.

The limit switches 50, 51, 52 are attached to the back of the left outer mast 13 at reference positions $H_{R1}$, $H_{R2}$, $H_{R3}$, respectively. The fork reference positions $H_{R1}$, $H_{R2}$, $H_{R3}$ correspond to reference positions $S_{R1}$, $S_{R2}$, $S_{R3}$ of the piston 26. The limit switches 50, 51, 52 detect that the piston 26 is at one of the reference positions $S_{R1}$, $S_{R2}$, $S_{R3}$, respectively. The positions $H_{R1}$, $H_{R2}$, $H_{R3}$ correspond to a low height range, middle height range, a high height range, respectively. The limit switches 50 to 52 are activated by a dog 41 and connected to the microcomputer 44 of the control unit 42.

As in the embodiment of FIGS. 1 to 3, the CPU 45 measures the time from when the ultrasonic transceiver 31 is commanded to produce ultrasonic waves to when the transceiver 31 receives the corresponding reflected waves. The CPU 45 then stores the measured time in the RAM 47 as an elapsed time tx, which corresponds to the position of the piston 26.

When receiving a detection signal from one of the limit switches 50 to 52, the CPU 45 stores a measured time in the RAM 47 as a reference time tP of the reference position $S_{R1}$, $S_{R2}$, $S_{R3}$, of the corresponding limit switch 50 to 52. The CPU 45 calculates the position Sx of the piston 26 using the following formula based on the newly measured elapsed time tx, the stored reference time tR and the reference position $S_{R1}$, $S_{R2}$ of $S_{R3}$ corresponding to the reference time tR.

$$Sx = tx \cdot v \times S_{R(N)}/tR \cdot v = tx \times S_{R(N)}/tR \tag{12}$$

in which $S_{R(N)}$ is one of the positions $S_{R1}$, $S_{R2}$ and $S_{R3}$.

The formula (2) is basically the same as the formula (1) of the embodiment of FIGS. 1 to 3. However, in the embodiment of FIG. 4, one of the reference positions $S_{R1}$, $S_{R2}$, and $S_{R3}$ is used as the reference position $S_{R(N)}$.

The operation of the height detector of FIG. 4 will now be described.

When the forklift 10 is started and the fork 15 is moved from the lowest position to the highest position, the limit switches 50, 51, 52 consecutively detect the reference positions $S_{R1}$, $S_{R2}$, and $S_{R3}$, respectively. When receiving a detection signal from one of the limit switches 50 to 52, the CPU 45 stores a elapsed time tx as a reference time tR for the corresponding position $S_{R1}$, $S_{R2}$ or $S_{R3}$. The CPU 45 calculates the position Sx of the piston 26 using the formula (2) based on the newly measured elapsed time tx, the reference time tR and one of the reference positions $S_{R1}$, $S_{R2}$ and $S_{R3}$ that corresponds to the reference time tR.

When the fork 15 is operated at a higher range, the piston 26 is moved in a limited upper range in the lift cylinder 20. Therefore, the reference positions $S_{R1}$, $S_{R2}$ are not detected by the limit switches 50, 51. However, the reference position $S_{R3}$ is frequently detected. Thus, the reference time tR is frequently renewed, and the piston position Sx is accurately calculated taking the oil temperature into account.

In the embodiment of FIG. 4, there are three reference positions $S_{R1}$, $S_{R2}$, $S_{R3}$, which correspond to the low height range, the middle height range, the upper height range of the fork 15, respectively. Therefore, when the fork 15 is operated in a limited range of height for relatively long time, at least one reference position $S_{R(N)}$ is detected, which thus renews the reference time tR. This results in accurate detection of the height of the fork 15.

Figure 5:
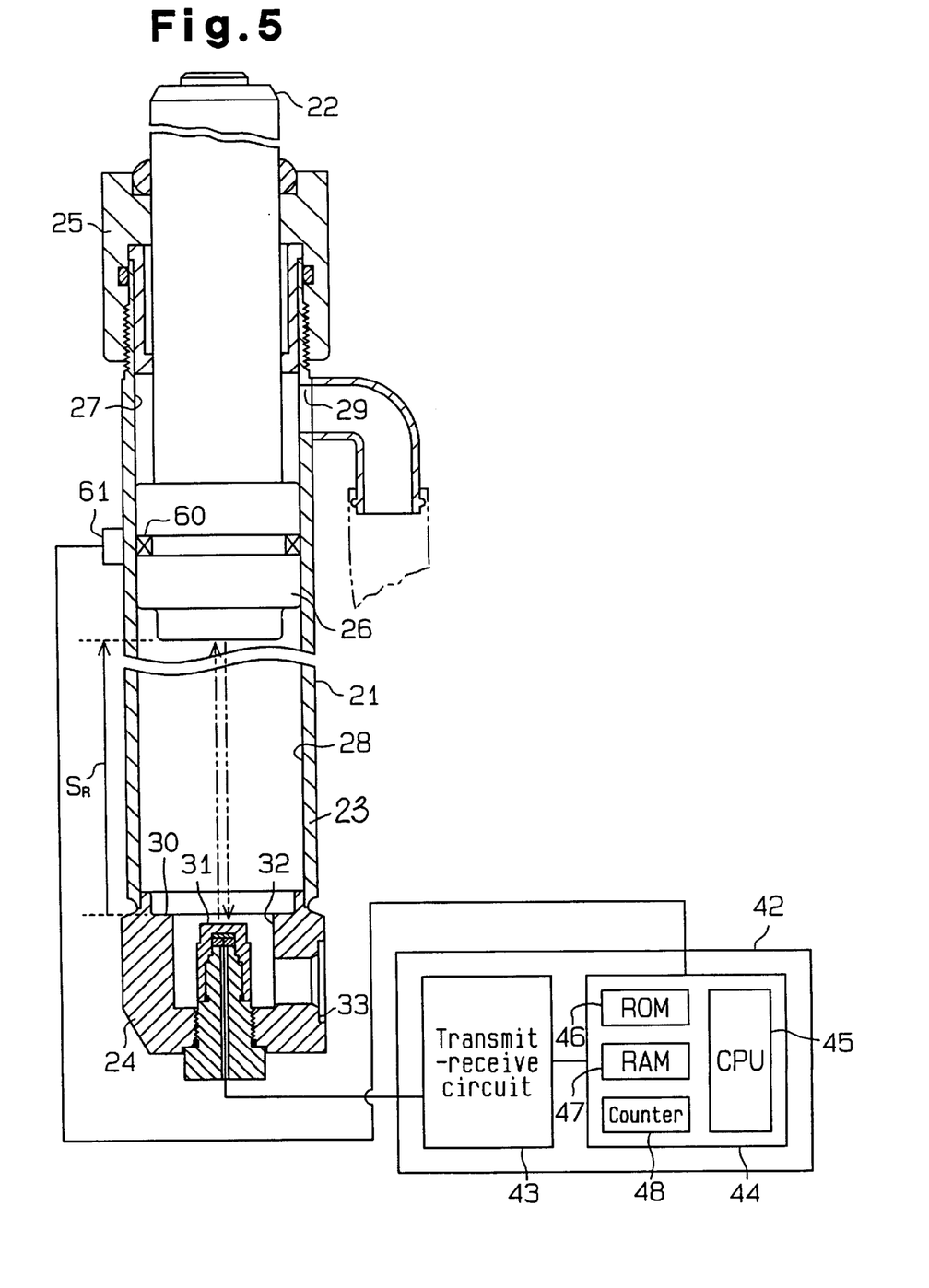
FIG. 5 is a cross-sectional view a height detector according to a third embodiment of the present invention.

In a third embodiment, instead of detecting the height of the fork 15, which corresponds to the position of the piston 26, the height of the piston 26 is directly detected.

As shown in FIG. 5, a magnet 60 and a magnetic proximity sensor 61 are used instead of the limit switches 39, 50, 51, 52 and the dog 41. The magnet 60 and the proximity sensor 61 detect the position of the piston 26. The magnet 60 is fixed to the circumferential surface of the piston 20. The proximity sensor 61 is secured to the outer surface of the cylindrical housing 23 to detect a reference position $S_R$ of the piston 26. The position of the proximity sensor 61 is determined such that the sensor 61 detects the magnet 60 when the piston 26 is at the reference position $S_R$.

Since the piston 26 does not vibrate significantly, the sensor 61 accurately detects the position of the piston 26. Also, the magnet 60 is accommodated in the cylinder body 21 and is not exposed. Therefore, even if foreign matter strikes the cylinder body 21, the magnet 60 is not damaged. Since the magnet 60 does not contact the proximity sensor 61, extended use does not wear the magnet 60 and the sensor 61. Thus, the detection of the reference position $S_R$ remains accurate for a long period.

Figure 8:
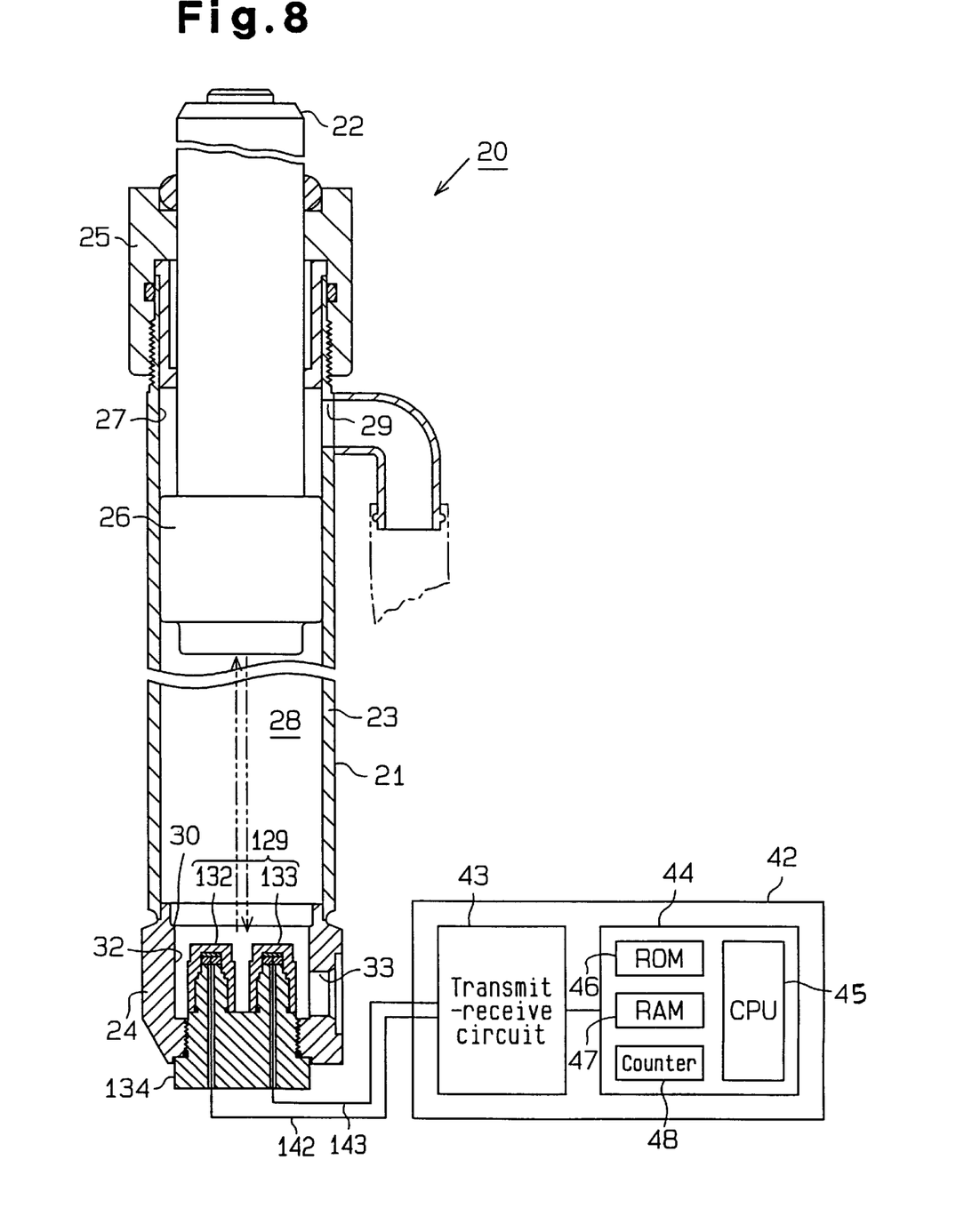
FIG. 8 is a cross-sectional view a height detector according to a fourth embodiment of the present invention.
Figure 9:
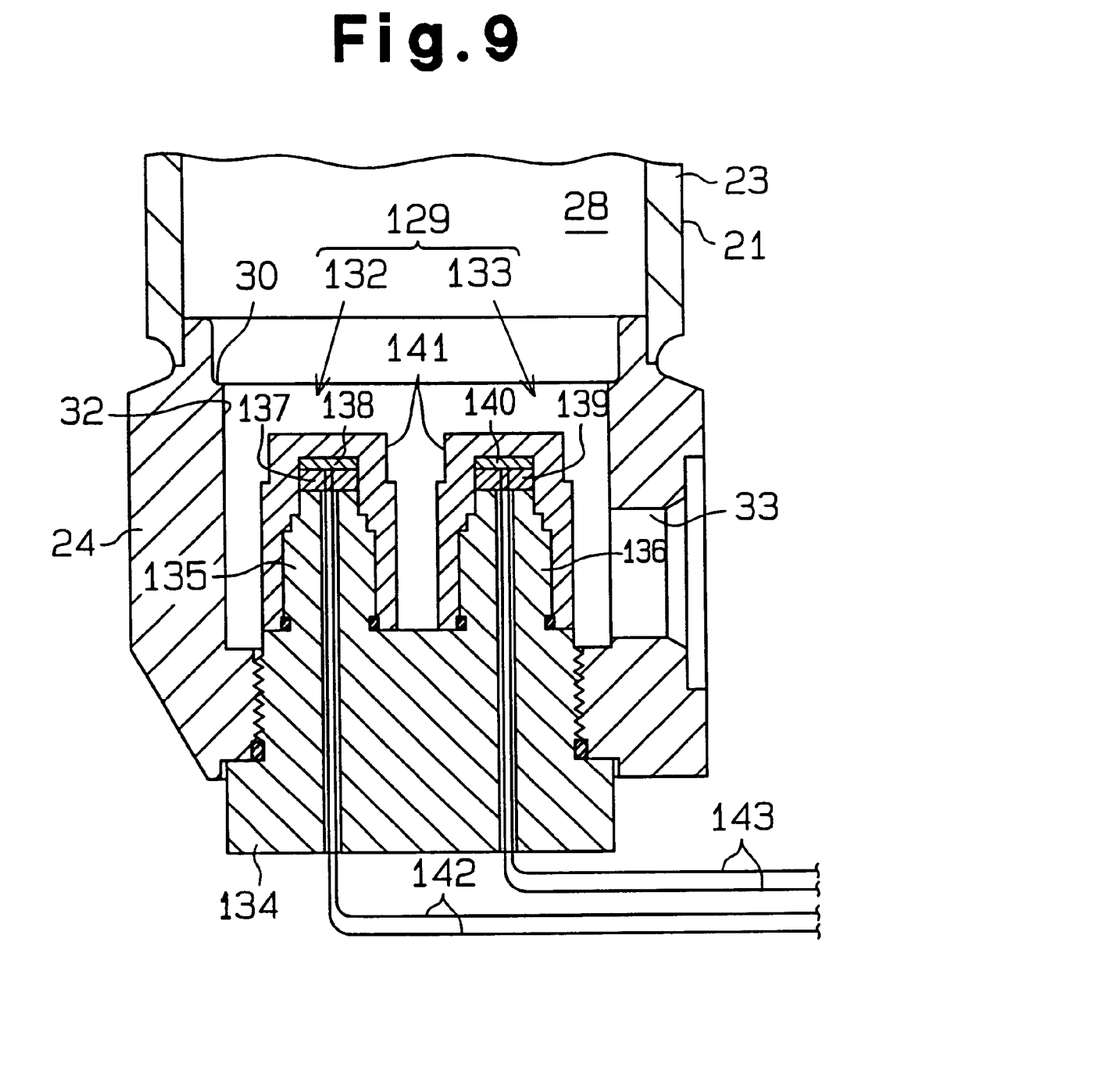
FIG. 9 is an enlarged partial cross-sectional view illustrating the lift cylinder of FIG. 8.

A height detector according to a fourth embodiment of the present invention will now be described with reference to FIGS. 8 and 9. The embodiment of FIGS. 8 and 9 is different from the embodiments of FIGS. 1 to 6 in that an ultrasonic transceiver 129 having an independent transmitter and an independent receiver is used. In the embodiment of FIGS. 8 and 9, the limit switch 39 and the dog 41 may be omitted.

As shown in FIGS. 8 and 9, the ultrasonic transceiver 129 has an ultrasonic transmitter 132 and an ultrasonic receiver 133. A case 134 of the transceiver 129 includes a transmitter projection 135 and a receiver projection 136. An acoustical material 137 is provided on the top of the transmitter projection 135. A transmitter element 138 is secured to the top of the acoustic material 137. The transmitter element 138 produces ultrasonic waves. An acoustic material 139 is provided on the top of the receiver projection 136. A receiver element 140 for receiving ultrasonic waves is secured to the top of the acoustic material 139. The receiver element 140 receives ultrasonic waves. The transmitter projection 135, the acoustic material 137 and the transmission element 138 are covered by a cap 141. The receiver projection 136, the acoustic material 139 and the receiver element 140 are covered by a cap 141. The transmitter 132 includes the transmitter projection 135, the acoustic material 137 and the transmitter element 138. The receiver 133 includes a receiving projection 136, the acoustic material 139 and the receiving element 140.

A pair of wires 142 are connected to the transmitter element 138 through the case 134. A pair of wires 143 are connected to the receiver element 140 through the case 134. The wires 142, 143 are connected to the control unit 42, which is located in the body frame 11.

The transmitter element 138 includes a transmitter surface facing the bottom of the piston 26. The receiver element 140 includes a receiver surface facing the bottom of the piston 26. When receiving a transmission signal through the wires 142, the transmitter element 138 oscillates to produce ultrasonic waves from the transmission surface to the bottom of the piston 26. The receiver element 140 receives ultrasonic waves reflected by the bottom of the piston 26 and outputs a reception signal in accordance with the amplitude of the received waves through the wires 143.

Upon receiving a control signal from the microcomputer 44, the transmit-receive circuit 43 outputs a transmit signal to oscillate the transmission element 138 at a predetermined frequency. On the other hand, the transmit-receive circuit 43 outputs a detection pulse signal to the microcomputer 44 when receiving a signal having a predetermined amplitude or greater from the receiving element 140.

The CPU 45 uses the counter 48 to measure time from when the ultrasonic wave is produced to when the CPU 45 receives a detection signal from the transmit-receive circuit 43. The CPU 45 calculates a distance corresponding to the time measured by the counter 48. Further, the CPU 45 relates the detected distance to the height of the fork 15. At this time, the detected distance may be used. Alternatively, a predetermined formula may be used to obtain a height value that corresponds to the height of the fork 15.

When commanded by the CPU 45, the transmitter element 138 produces ultrasonic waves. The ultrasonic waves are reflected on the bottom the piston 26. The reflected waves are received by the reception element 140. The time from when the ultrasonic waves are produced to when the reflected waves are received corresponds to the position of the piston 26, or the height of the fork 15. The receiving element 140 outputs a reception signal to the transmit-receive circuit 43 when receiving the reflected waves. The transmit-receive circuit 43 outputs a detection signal, which corresponds to the reception signal, to the microcomputer 44. The CPU 45 uses the counter 48 to measure time from when the transmission element 138 is commanded to produce ultrasonic wave to when the CPU 45 receives a corresponding detection signal. The CPU 45 calculates a value representing the distance to the piston 26 in accordance with the measured time.

Figure 10:
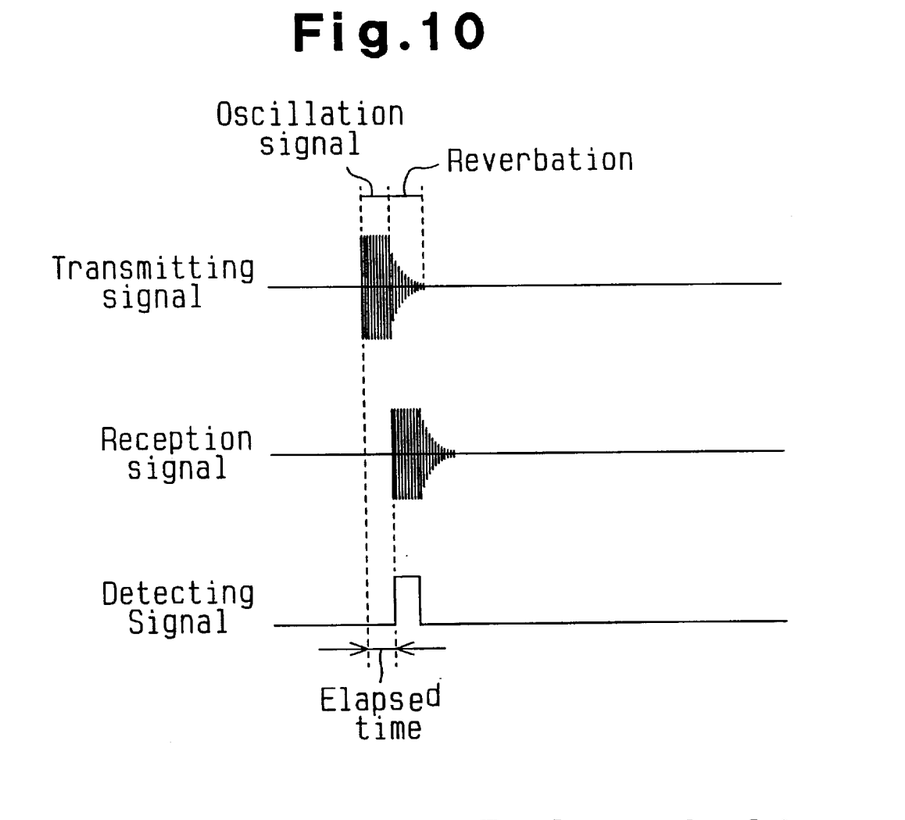
FIG. 10 is a graph showing voltage signals generated in ultrasonic transmitting and receiving elements in the height detector of FIG. 8.

If the fork 15 is at the lowest position, the distance between the piston 26 and the transmitter 132 and the receiver 133 is extremely short. When the transmission element 138 produces ultrasonic waves, the ultrasonic waves reflected by the piston 26 are received by the receiving element 140 while reverberation remains. As shown in FIG. 10, a reception signal caused by the reflected wave occurs while a voltage signal due to reverberation is occurring. However, the reflected wave is received by the receiving element 140, which is separated from the transmitting element 138. Thus, the transmit-receive circuit 43 does not receive a signal based on the reverberation through the receiving element 140. In other words, the transmit-receive circuit 43 only receives the reception signal based on the reflected wave. Therefore, even if a reflected wave reaches the receiving element 140 while there is reverberation, or if the piston 26 is extremely close to the ultrasonic transceiver 129, the CPU 45 accurately detects the position of the piston 26 without being affected by the reverberation of the transmitting element 138. As a result, the height of the fork 15 is accurately detected in the entire movement range of the lift cylinder 20.

In this embodiment, the transmitting element 138 and the receiving element 140 are removably attached to the lift cylinder 20 as a unit. Therefore, the elements 138, 140 are easily attached to and detached from the lift cylinder 20. However, the transmitting element 138 and the receiving element 140 may be formed on separate sensor cases. In this case, the transmitting element 138 and the receiving element 140 are separately attached to and detached from the lift cylinder 20.

It should be apparent to those skilled in the art that the present invention may be embodied in many other specific forms without departing from the spirit or scope of the invention. Particularly, it should be understood that the invention may be embodied in the following forms.

In the illustrated embodiments, the transmit-receive circuit 43 and the microcomputer 44 may be integrated with the ultrasonic sensors 31, 129. In this case, the ultrasonic transceiver 31, 129 directly outputs a distance detection value of the piston position Sx. The height of the fork 15 is controlled based on the distance detection value by a microcomputer provided in the body frame. The microcomputer on the body frame does not have to control transmission of ultrasonic waves or calculate the position of the piston 26. Therefore, the microcomputer in the body frame executes fewer programs, and its workload is lightened.

In the embodiments of FIGS. 1 to 4, the limit switches 39, 50, 51, 52 may be replaced with non-contact type switches such as proximity switches and photoelectric switches. Such proximity switches include a Hall element type proximity switch, which is a magnetic sensor, a magnetic reluctance proximity switch and a high frequency stopping type proximity switch. The photoelectric switches may include a transmission photo electric switch, a reflection type photo electric switch and an optical fiber type photo electric switch. A non-contact type sensor has no wearing parts, which allows the device to accurately detect the fork height for a long period.

The present invention may be embodied in a device to detect the stroke of one of the tilt cylinders 62 coupled to the mast assembly 12. The stroke of the tilt cylinders 62 represents the tilt angle of the mast assembly 12. Therefore, the tilt angle of the mast assembly 12 is continuously detected in accordance with the detected stroke. This structure allows the tilt angle to be detected despite temperature changes of oil by detecting the piston position of the tilt cylinder 62. As a result, controls performed based on the tilt angle of the mast assembly 12 will be accurate.

The implement is not limited to the illustrated fork 15 but may include a side shifter fork, a hinged fork, a rotational fork, a bail clamp, a roll clamp, a RAM or other known implements.

The illustrated embodiments may be used in other industrial vehicles having a hydraulic cylinder. For example, the embodiments may be used in a carrier vehicle or a construction vehicle. The present invention may also be embodied in cylinders other than hydraulic cylinders using oil, for example in liquid-pressure cylinders and fluid cylinders. For example, the present invention may be embodied in a tractor shovel, in which a bucket is controlled by cylinders, on a vehicle for high lift work having a boom, the angle of which is controlled by a telescopic cylinder.

The present examples and embodiments are to be considered as illustrative and not restrictive and the invention is not to be limited to the details given herein, but may be modified within the scope and equivalence of the appended claims.

What is claimed is:

1. A position detector for a piston in a fluid cylinder, wherein the piston is axially moved within a predetermined range by fluid and the fluid pressure, the position detector comprising:

an ultrasonic transceiver provided in the cylinder, the transceiver being located near one end of the cylinder and outside of the moving range of the piston, wherein the transceiver transmits an ultrasonic wave to a reflection surface of the piston through a fluid in response to an electrical signal, and wherein the transceiver receives the ultrasonic wave reflected by the piston and generates an electrical signal, which corresponds to the reflected wave;

a reference position detector for detecting that the piston is at a predetermined reference position; and a computer for supplying an electrical transmit signal to the transceiver, which causes the transceiver to transmit an ultrasonic signal, and for receiving an electrical reception signal from the transceiver, wherein the computer computes a time value representing the time from when an ultrasonic wave is transmitted to when the reflected wave is received, wherein the computer computes a speed indication value that indicates the speed of the ultrasonic signal when the piston is at the reference position, and wherein the computer computes the current position of the piston based on the speed indication value and on a current reading of the time value.

2. The position detector according to claim 1, wherein the reference position is a first reference position, and further comprising a second reference position different from the first reference position, wherein the reference position detector detects that the piston is one of the reference positions, wherein the computer renews the speed indication value when the piston moves to either of the reference positions.

3. The position detector according to claim 1, wherein the fluid cylinder forms a part of a forklift, and wherein the forklift includes a mast connected to the fluid cylinder and an implement moved by the mast.

4. The position detector according to claim 3, wherein the fluid cylinder comprises a lift cylinder for lifting and lowering the mast in a substantially vertical direction, and wherein the implement comprises a fork.

5. The position detector according to claim 4, wherein the reference position is in a range of movement of the piston that corresponds to a range of movement of the implement.

6. The position detector according to claim 5, wherein the reference position is in a moving range of the piston that is below a middle position of the piston.

7. The position detector according to claim 4, wherein the forklift includes an outer mast and an inner mast, the inner mast being lifted and lowered by the lift cylinder, wherein the reference position detector includes a dog attached to the inner mast and a limit switch attached to the outer mast.

8. The position detector according to claim 3, wherein the fluid cylinder is a tilt cylinder for inclining the mast, and wherein the implement includes a fork.

9. The position detector according to claim 1, wherein the reference position detector comprises a switch.

10. The position detector according to claim 1, wherein the reference position detector comprises a non-contact type sensor.

11. The position detector according to claim 10, wherein the reference position detector includes a detected member provided on the piston and a sensor member provided on a fixed member, and wherein the sensor member detects the detected member.

12. The position detector according to claim 1, wherein the transceiver comprises a single transmit-receive element, which both transmits and receives ultrasonic waves.

13. The position detector according to claim 1, wherein the computer computes the current position of the piston using the following equation:

$Sx = tx \times S_R / tR$ in which Sx represents the current piston position, tx represents the current time value, $S_R$ represents the distance from the transceiver to the piston when the piston is at the reference position and tR represents the time value detected when the piston is at the reference position.

14. The position detector according to claim 1, wherein the speed indication value represents the speed of an ultrasonic wave and is calculated by dividing the distance from the piston to the transceiver when the piston is in the reference position with the time value when the piston is in the reference position.

15. A fluid cylinder having a piston, wherein the piston is axially moved within a predetermine range by fluid pressure, the cylinder comprising:
  an ultrasonic transceiver provided in the cylinder, the transceiver being located near one end of the cylinder and outside of the moving range of the piston, wherein the transceiver transmits an ultrasonic wave to a reflection surface of the piston through a fluid in response to an electrical signal, and wherein the transceiver receives the ultrasonic wave reflected by the piston and generates an electrical signal, which corresponds to the reflected wave; and
  a reference position detector for detecting that the piston is at a predetermined reference position, wherein the reference position detector comprises a switch.

16. An industrial vehicle comprising:
  an implement;
  a mast for moving the implement; and
  a position detector for detecting the position of the mast, wherein the position detector includes:
    a fluid cylinder for moving the mast, wherein the cylinder includes a piston, the piston being axially moved within a predetermined range by fluid pressure;
    an ultrasonic transceiver provided in the cylinder, the transceiver being located near one end of the cylinder and outside of the moving range of the piston, wherein the transceiver transmits an ultrasonic wave to a reflection surface of the piston through a fluid in response to an electrical signal, and wherein the transceiver receives the ultrasonic wave reflected by the piston and generates an electrical signal, which corresponds to the reflected wave;
    a reference position detector for detecting that the piston is at a predetermined reference position; and
    a computer for supplying an electrical transmit signal to the transceiver, which causes the transceiver to transmit an ultrasonic signal, and for receiving an electrical reception signal from the transceiver, wherein the computer computes a time value representing the time from when an ultrasonic wave is transmitted to when the reflected wave is received, wherein the computer computes a speed indication value that indicates the speed of the ultrasonic signal when the piston is at the reference position, and wherein the computer computes the current position of the piston based on the speed indication value and on a current reading of the time value thereby detecting the position of the implement, which corresponds to the piston position.

17. The industrial vehicle according to claim 16, wherein the vehicle is a forklift, wherein the fluid cylinder comprises a lift cylinder for lifting and lowering the mast in a substantially vertical direction, and wherein the implement comprises a fork.

18. The industrial vehicle according to claim 16, wherein the vehicle is a forklift, wherein the fluid cylinder comprises a tilt cylinder for inclining the mast, and wherein the implement includes a fork.

19. A fluid cylinder having a piston, the piston being axially moved within a predetermined range by fluid and the pressure of the fluid, the cylinder comprising:
  a transmitting element located in the fluid cylinder to transmit ultrasonic waves to a reflection surface of the piston;
  a receiving element located in the fluid cylinder, wherein the receiving element is separated from the transmitting element, and wherein the receiving element receives the ultrasonic waves reflected by the piston; and
  a case for supporting the transmitter element and the receiving element, and wherein the case, together with the transmitting and receiving elements, is removably attached to the fluid cylinder.

20. A position detector for a piston in a fluid cylinder, wherein the fluid cylinder is a tilt cylinder and the piston is moved within a predetermined range by fluid and the pressure of the fluid, the position detector comprising:
  a transmitting element provided in the cylinder, the transmitting element being located outside of the moving range of the piston, wherein the transmitting element transmits an ultrasonic wave to a reflection surface of the piston through a fluid in response to an electrical signal;
  a receiving element located in the fluid cylinder, the receiving element being located outside of the moving range of the piston, wherein the receiving element is separated from the transmitting element, and wherein the receiving element receives the ultrasonic waves reflected by the piston and generates an electrical signal, which corresponds to the reflected wave; and
  a computer for supplying and electrical signal to the transmitting element to cause the transmitting element to transmit an ultrasonic wave, wherein the computer receives the electrical signal corresponding to the reflected wave from the receiving element, wherein the computer computes a distance detection value, which is a function of the travel time from when an ultrasonic wave is transmitted to when the reflected wave is received.

21. The position detector according to claim 21, wherein the fluid cylinder forms a part of a forklift, and wherein the forklift includes a mast connected to the fluid cylinder and an implement moved by the mast.

22. The position detector according to claim 21, wherein the tilt cylinder inclines the mast, and wherein the implement includes a fork.

23. The position detector according to claim 20, further including a reference position detector for detecting that the piston is at a predetermined reference position, wherein the computer determines a speed indication value when the piston is detected to be at the reference position, and wherein the computer computes the current position of the piston based on the speed indication value and on a current reading of the travel time.

24. An industrial vehicle comprising:
   an implement;
   a mast for moving the implement;
   a position detector for detecting the position of the mast;
   a fluid cylinder for moving the mast, wherein the fluid cylinder comprises a tilt cylinder for inclining the mast, and wherein the fluid cylinder includes a piston, the piston being moved within a predetermined range by fluid pressure,
   a transmitting element provided in the cylinder, the transmitting element being located outside of the moving range of the piston, wherein the transmitting element transmits an ultrasonic wave to a reflection surface of the piston through a fluid in response to an electrical signal;
   a receiving element located in the fluid cylinder, the receiving element being located outside of the moving range of the piston, wherein the receiving element is separated from the transmitting element, and wherein the receiving element receives the ultrasonic waves reflected by the piston and generates an electrical signal, which corresponds to the reflected wave; and
   a computer for supplying and electrical signal to the transmitting element to cause the transmitting element to transmit an ultrasonic wave, wherein the computer receives the electrical signal corresponding to the reflected wave from the receiving element, wherein the computer computes a distance detection value, which is a function of the travel time from when an ultrasonic wave is transmitted to when the reflected wave is received.

25. The industrial vehicle according to claim 24, wherein the vehicle is a forklift, and wherein the implement includes a fork.

26. A method for detecting the position of a piston in a fluid cylinder including:
   periodically transmitting an ultrasonic signal from a fixed position to the piston through the fluid;
   receiving the reflected ultrasonic signal;
   measuring time from when the ultrasonic signal is transmitted to when the reflected ultrasonic signal is received;
   judging that the piston is at a reference position, wherein the reference position is at a predetermined distance from the fixed position;
   computing a speed indication value that indicates the speed of the ultrasonic signal based on the measured time and the reference position when the piston is at the reference position; and
   computing the current position of the piston based on the speed indication value and a current reading of the measured time.

27. The method according to claim 26, including renewing the speed indication value if the piston returns to the reference position.

28. A method for detecting the position of a piston in a fluid cylinder including:
   periodically transmitting an ultrasonic signal from a first location to the piston through the fluid;
   receiving the reflected ultrasonic signal at a second location, wherein the first location is spaced from the second location;
   measuring time from when the ultrasonic signal is transmitted to when the reflected ultrasonic signal is received;
   judging that the piston is at a reference position, wherein the reference position is at a predetermined distance from the first location and second location;
   computing a speed indication value that indicates the speed of the ultrasonic signal based on the measured time and the reference position when the piston is at the reference position; and
   calculating the current position of the piston based on the speed indication value and a current reading of the measured time.

29. A fluid cylinder having a piston, wherein the piston is axially moved within a predetermine range by fluid pressure, the cylinder comprising:
   an ultrasonic transceiver provided in the cylinder, the transceiver being located near one end of the cylinder and outside of the moving range of the piston, wherein the transceiver transmits an ultrasonic wave to a reflection surface of the piston through a fluid in response to an electrical signal, and wherein the transceiver receives the ultrasonic wave reflected by the piston and generates an electrical signal, which corresponds to the reflected wave; and
   a reference position detector for detecting that the piston is at a predetermined reference position, wherein the reference position detector comprises a non-contact type sensor which includes a detected member provided on the piston and a sensor member provided on a fixed member, and wherein the sensor member detects the detected member.

* * * * *